(12) United States Patent
Poulsen

(10) Patent No.: US 10,577,129 B1
(45) Date of Patent: Mar. 3, 2020

(54) APPARATUS AND METHODS FOR LAUNCHING A PAYLOAD

(71) Applicant: Peter Davis Poulsen, Grants Pass, OR (US)

(72) Inventor: Peter Davis Poulsen, Grants Pass, OR (US)

(*) Notice: Subject to any disclaimer, the term of this patent is extended or adjusted under 35 U.S.C. 154(b) by 858 days.

(21) Appl. No.: 15/157,414

(22) Filed: May 18, 2016

Related U.S. Application Data

(60) Provisional application No. 62/179,767, filed on May 19, 2015.

(51) Int. Cl.
| | |
|---|---|
| *B64G 5/00* | (2006.01) |
| *B64G 1/00* | (2006.01) |
| *F42B 10/46* | (2006.01) |
| *B64C 5/04* | (2006.01) |

(52) U.S. Cl.
CPC .............. *B64G 1/002* (2013.01); *B64C 5/04* (2013.01); *F42B 10/46* (2013.01)

(58) Field of Classification Search
CPC .. B64G 1/002; B64G 1/409; F41F 3/04; F41F 3/042; F42B 14/00; F42B 10/46; F42B 12/58; F42B 12/62
See application file for complete search history.

(56) References Cited

U.S. PATENT DOCUMENTS

| | | | | |
|---|---|---|---|---|
| 3,167,016 A | * | 1/1965 | Czerwinski | F02K 9/763 102/377 |
| 3,369,455 A | * | 2/1968 | Jones | F42B 15/00 102/374 |
| 3,369,485 A | * | 2/1968 | Jones | F42B 15/00 102/374 |
| 3,491,692 A | * | 1/1970 | Blankenagel | F42B 10/12 102/377 |
| 3,721,196 A | * | 3/1973 | Willis | F42B 12/70 102/505 |

(Continued)

OTHER PUBLICATIONS www.space.com/23433-elysium-space-burial-human-ashes, Launching to Heaven: Space Burial Company to Send Human Ashes Into Orbit, by Tanya Lewis, Nov. 4, 2013.*

(Continued)

*Primary Examiner* — Benjamin P Lee
(74) *Attorney, Agent, or Firm* — David S. Alavi

(57) ABSTRACT

An apparatus for launching a payload includes a primary barrel, a primary projectile including a secondary barrel, and a secondary projectile including the payload. Prior to firing the apparatus to launch the payload, the primary projectile is contained within the primary barrel, and the secondary projectile is contained within the secondary barrel. Ignition, detonation, or expansion of a primary propellant within the primary barrel launches the primary projectile from the primary barrel. Ignition, detonation, or expansion of a secondary propellant within the secondary barrel launches the secondary projectile from the secondary barrel. The secondary projectile can further include a volume of a secondary explosive material; detonation of the secondary explosive material propels at least a portion of the payload away from a remainder of the secondary projectile. The payload can include cremation remains, DNA, or text, images, or other information.

23 Claims, 3 Drawing Sheets

(56) References Cited

U.S. PATENT DOCUMENTS

| | | | | |
|---|---|---|---|---|
| 3,859,890 | A * | 1/1975 | Guthrie | F41F 3/04 |
| | | | | 102/351 |
| 4,050,351 | A * | 9/1977 | Stauff | F41A 1/10 |
| | | | | 89/1.701 |
| 4,198,896 | A * | 4/1980 | Lamic | F02K 9/763 |
| | | | | 102/377 |
| 4,964,339 | A * | 10/1990 | Bastian | F02K 9/10 |
| | | | | 102/376 |
| 7,775,148 | B1 | 8/2010 | McDermott | |
| 9,273,943 | B1 * | 3/2016 | Poulsen | F42B 10/00 |
| 2012/0175457 | A1 | 7/2012 | Hunter et al. | |
| 2018/0362191 | A1 * | 12/2018 | Russell | B64G 1/002 |

OTHER PUBLICATIONS

Gilreath et al; The Feasibility of Launching Small Satellites with a Light Gas Gun; 12th AIAA/USU Conference on Small Satellites, Paper No. SSC98-III-6, 1998.

Stivers et al; Studies of optimum body shapes at hypersonic speeds; NASA Technical Note D-4191; 1967.

* cited by examiner

APPARATUS AND METHODS FOR LAUNCHING A PAYLOAD

BENEFIT CLAIMS TO RELATED APPLICATIONS

This application claims benefit of U.S. provisional App. No. 62/179,767 filed May 19, 2015 in the name of Peter Davis Poulsen, said provisional application being hereby incorporated by reference as if fully set forth herein.

FIELD OF THE INVENTION

The field of the present invention relates to launching payloads. Apparatus and methods are described herein for launching a payload.

BACKGROUND

There have been a number of research efforts to develop a gun-launch alternative for launching payloads into space. Potential advantages of gun launching can include relatively lower cost, shorter launch preparations, relatively rapid turnaround between successive launches, or relative insensitivity to weather conditions at the launch site (because the fastest, and therefore least vulnerable, portions of the launched projectile's flight occurs as it exits the barrel of the gun, so that ground-level weather has a lesser effect on the flight).

Previous efforts to develop a gun-launch system for launching payloads into space include the High Altitude Research Program (HARP) in the 1960's and the Super High Altitude Research Program (SHARP) in the late 1980's and early 1990's; both of those were research programs of the United States government. During the course of HARP a 185 lb. rocket body was launched at a muzzle velocity of 2,160 m/s (7,100 ft/s or about Mach 6), reaching an altitude of about 180 kilometers (591,000 ft). A 5 kg projectile was launched at a muzzle velocity of 3,000 m/s (6,700 mph or about Mach 9) during the course of SHARP. Both projects were eventually cancelled.

Strictly ballistic flight following launch (i.e., without further propulsion after leaving the gun barrel) will not achieve a stable orbit. To achieve a stable earth orbit, additional, guided propulsion is required, typically a secondary propellant, a secondary explosive charge, a rocket motor, or other on-board propulsion and guidance system incorporated into the projectile. One example is disclosed in the paper of Gilreath et al ("The Feasibility of Launching Small Satellites with a Light Gas Gun"; 12th AIAA/USU Conference on Small Satellites, Paper No. SSC98-III-6; 1998). Typically the on-board propulsion (e.g., a rocket motor) would not fire until after an initial period of strictly ballistic flight after launch from the gun barrel. At an appropriate point in the ballistic flight, the on-board propulsion can be fired to achieve orbital insertion. In contrast, if only sub-orbital flight is needed or desired, on-board propulsion and guidance of the projectile may not be needed; strictly ballistic flight could be sufficient in some instances. Likewise, if escape velocity is needed or desired without orbital insertion, then on-board propulsion and guidance may not be required if the muzzle velocity of the gun launch is sufficiently large (i.e., if the muzzle velocity exceeds escape velocity by a margin sufficient to allow for aerodynamic drag on the projectile during its flight). If the muzzle velocity is not large enough, on-board propulsion can be employed to achieve escape velocity.

The initial, ballistic portion of the projectile's flight, after being launched from the gun, is substantially determined by elevation and azimuth of the gun barrel, the muzzle velocity, aerodynamic drag on the projectile, and wind conditions. Typically, the projectile follows a generally parabolic, hyperbolic, or elliptical trajectory. Without additional, onboard propulsion, the projectile either reaches an apogee and falls back to earth, or escapes earth's gravitation altogether (if the muzzle velocity, reduced by aerodynamic drag, exceeds escape velocity). If orbital insertion is desired, or if muzzle velocity alone is insufficient to escape earth's gravity, then additional, on-board propulsion typically is required and can be implemented in a variety of ways.

U.S. Pat. No. 9,273,943 (issued Mar. 1, 2016 to Poulsen on application Ser. No. 14/190,607; both patent and application are incorporated by reference as if fully set forth herein) discloses apparatus and methods for gun launch of a payload into space (sub-orbital, orbital, or exceeding escape velocity) using a projectile with an aerodynamic housing.

SUMMARY

An apparatus for launching a payload comprises a primary barrel, a primary projectile including a secondary barrel, and a secondary projectile including the payload. Prior to firing the apparatus to launch the payload, the primary projectile is contained within the primary barrel, and the secondary projectile is contained within the secondary barrel. The primary barrel and the primary projectile are arranged so that ignition, detonation, or expansion of a primary propellant within the primary barrel launches the primary projectile from the primary barrel. The secondary barrel and the secondary projectile are arranged so that ignition, detonation, or expansion of a secondary propellant within the secondary barrel launches the secondary projectile from the secondary barrel.

The apparatus can be further arranged so that the secondary projectile includes a volume of a secondary explosive material that is arranged so that detonation of the secondary explosive material propels at least a portion of the payload away from a remainder of the secondary projectile in a payload launch direction. The volume of the secondary explosive material can further include a concavity on a surface thereof that is arranged so as to direct preferentially, in the payload launch direction, blast force resulting from detonation of the secondary explosive material. The secondary projectile can further include a liner in the concavity arranged so that, upon detonation of the secondary explosive material, the liner forms a slug of liner material launched along the payload launch direction.

The primary projectile can include one or more aerodynamic structural elements arranged so as to result in a desired atmospheric flight attitude, or reduce aerodynamic drag, during flight of the primary projectile through a portion of earth's atmosphere after being launched from the primary barrel. One or both of the primary projectile or the secondary projectile can be arranged so as to trigger launch of the secondary projectile from the secondary barrel only when the primary projectile is within a selected altitude window, or falls below a selected speed threshold, after launch from the primary barrel. The primary or secondary projectile can include an altimeter, a velocity meter, or a timer arranged so as to trigger launch of the secondary projectile from the secondary barrel only when the primary projectile is within the selected altitude window or falls below the selected speed threshold. The primary projectile can be arranged so as to be substantially vertical while launching the secondary projectile from the secondary barrel, or can include a guidance system arranged so as to alter attitude of the primary projectile from an atmospheric flight attitude to a secondary launch attitude, during or after a latter portion of atmospheric flight of the primary projectile and before launching the secondary projectile from the secondary barrel.

A method for launching a payload using any one of the disclosed apparatus comprises: (A) loading the secondary projectile incorporating or containing the payload into the secondary barrel of the primary projectile; (B) loading the primary projectile into the primary barrel; (C) igniting, detonating, or expanding the primary propellant within the primary barrel to launch the primary projectile from the primary barrel; and (D) after launching of the primary projectile, igniting or detonating the secondary propellant within the secondary barrel to launch the secondary projectile from the secondary barrel. The method can further comprise, after igniting or detonating the secondary propellant, detonating the volume of secondary explosive material incorporated into the secondary projectile to propel at least a portion of the payload away from a remainder of the secondary projectile in a payload launch direction.

A method for preparing a payload for launch using any one of the disclosed apparatus comprises including, incorporating, or containing the payload in the secondary projectile. The secondary projectile is arranged to be loaded into the secondary barrel of a primary projectile so that ignition, detonation, or expansion of the secondary propellant within the secondary barrel launches the secondary projectile from the secondary barrel. The primary projectile is arranged to be loaded into the primary barrel so that ignition, detonation, or expansion of the primary propellant within the primary barrel launches the primary projectile from the primary barrel. The method can further comprise incorporating the volume of secondary explosive material into the secondary projectile; the volume of secondary explosive material is arranged so that detonation of the secondary explosive material propels at least a portion of the payload away from a remainder of the secondary projectile in a payload launch direction.

The primary projectile, the secondary projectile, the payload, the secondary explosive material, or the liner can include, incorporate, or contain (i) human or animal cremation remains, (ii) human or animal DNA, or (iii) encoded, embedded, inscribed, incorporated, or contained text, images, or other information.

Objects and advantages pertaining to launching payloads may become apparent upon referring to the example embodiments illustrated in the drawings and disclosed in the following written description or appended claims.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The embodiments depicted are shown only schematically: all features may not be shown in full detail or in proper proportion, certain features or structures may be exaggerated relative to others for clarity, and the drawings should not be regarded as being to scale. The embodiments shown are only examples: they should not be construed as limiting the scope of the present disclosure or appended claims.

DETAILED DESCRIPTION OF EMBODIMENTS

Inventive apparatus and methods disclosed or claimed herein can be advantageously employed for launching payloads, particularly very small payloads (e.g., less than about 10. g, less than about 5 g, less than about 1.0 g, less than about 0.5 g, less than about 0.10 g, less than about 0.05 g, less than about 0.010 g, less than about 0.005 g, or less than about 0.0010 g). Such small payloads to be launched can include, e.g., human or animal cremation remains, human or animal DNA, text, image, or other information, or other suitable small payloads that are similarly able to withstand the high accelerations or explosive forces that occur in the launch methods described below.

A multi-stage scheme is employed wherein a primary projectile is launched from a primary barrel (thereby providing a first stage of propulsion), the primary projectile includes a secondary barrel, and during ballistic flight of the primary projectile a secondary projectile that includes the payload is launched from the secondary barrel (thereby providing a second stage of propulsion). In some embodiments a third stage of propulsion is provided by a secondary explosive material included in the secondary projectile that propels the payload away from the remainder of the secondary projectile. The inventive apparatus and methods can be employed for suborbital space flight of the payload, for orbital insertion of the payload (if a guidance system is employed), or for propelling the payload to reach or exceed earth escape velocity.

Figure 1:
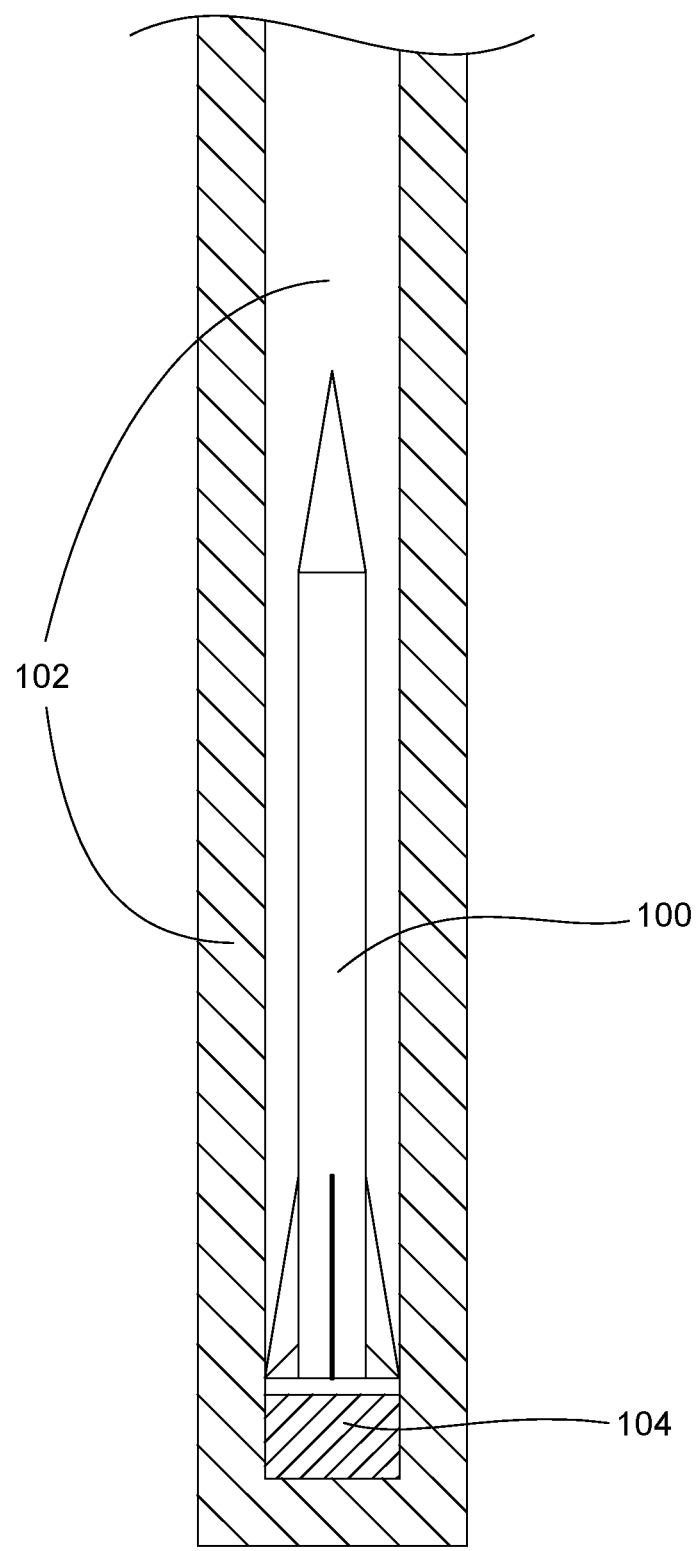
FIG. 1 illustrates schematically an example of a primary projectile positioned within a longitudinal cross section of a primary barrel.
Figure 2:
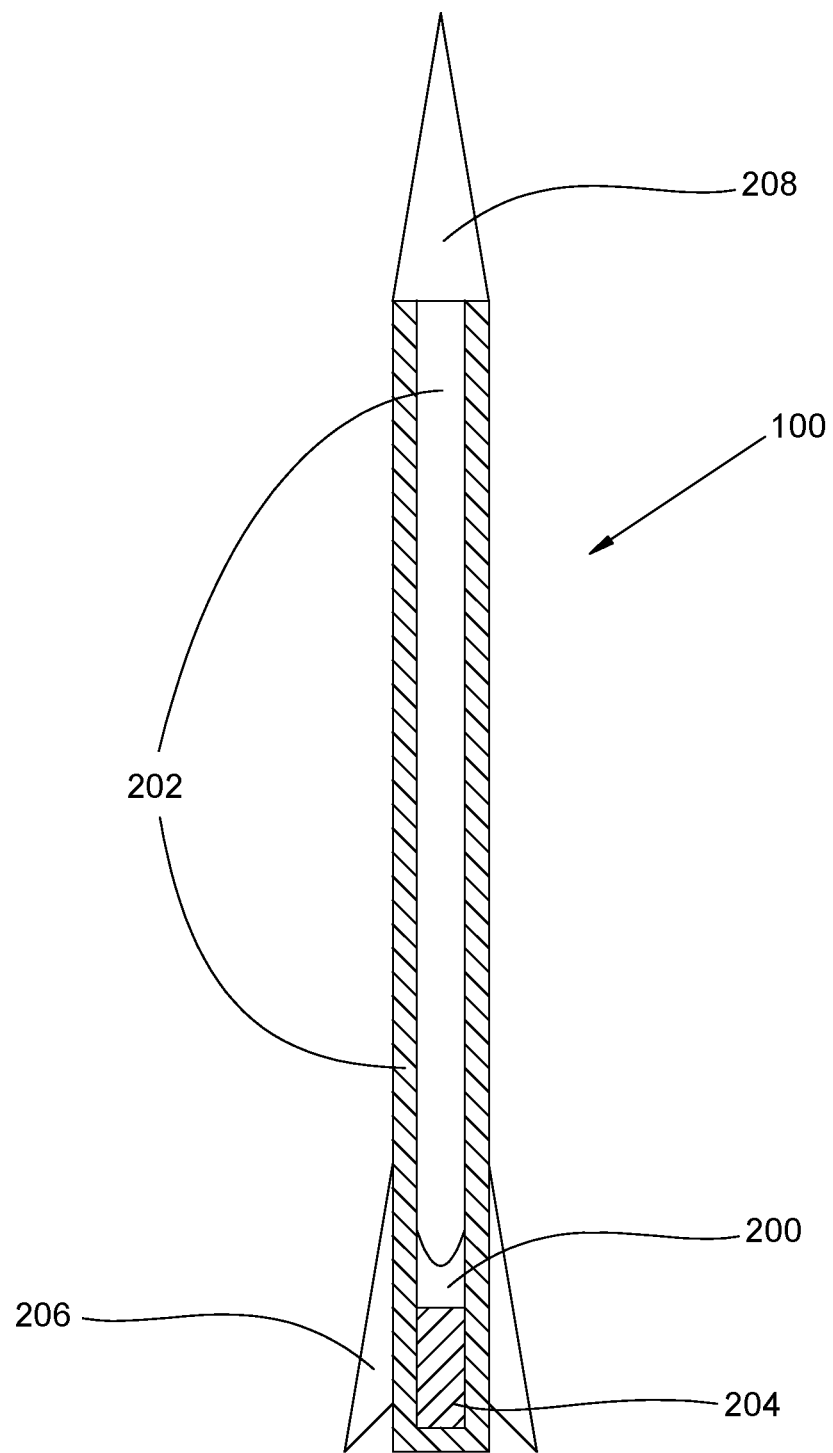
FIG. 2 illustrates schematically an example of a secondary projectile positioned within a longitudinal cross section of a secondary barrel of a primary projectile.

An apparatus for launching a payload comprises a primary barrel 102, a primary projectile 100 including a secondary barrel 202, and a secondary projectile 200 including the payload (FIGS. 1 and 2). The primary barrel 102 can be arranged as a gun in any suitable way and can be made from any one or more suitable materials, for example various steels or other metals commonly employed for making gun or cannon barrels. Prior to firing the apparatus to launch the payload, the primary projectile 100 is contained within the primary barrel 102, and the secondary projectile 200 is contained within the secondary barrel 202. The primary barrel 102 and the primary projectile 100 can be arranged as a gun or cannon in any suitable way so that ignition, detonation, or expansion of a primary propellant within the primary barrel 102 launches the primary projectile 100 from the primary barrel 102, thereby providing the first stage of propulsion for the payload.

In some embodiments, the primary propellant comprises a combustible or explosive compound or mixture 104, typically packed into the primary barrel 102 behind the primary projectile 100. Expansion of a gas or gaseous mixture released by ignition or detonation of the primary propellant 104 propels the primary projectile 100 out of the primary barrel 102. Any one or more suitable combustible or explosive material can be employed. In some other embodiments, expanding gas or gases that propel the primary projectile 100 through the primary barrel 102 are provided by releasing or injecting those gases (e.g., compressed air) into the primary barrel 102 behind the primary projectile 100. In either type of embodiment, if needed or desired, the primary barrel 102 can be arranged so that expanding gas or gases enter the primary barrel 102 at multiple locations along the length of the primary barrel 102. In either type of embodiment, if needed or desired, the primary projectile 100 can be provided with one or more sabots or push plates to facilitate propulsion of the primary projectile 100 through the primary barrel 102 by the expanding gas or gases. In either type of embodiment, the primary propellant 104 can expand only from the base of the primary barrel 102, or can expand from multiple location along the primary barrel 104.

In many instances in which launching the payload into space is desired, the primary barrel 102 is substantially vertical during launch of the primary projectile 100; other orientations of the primary barrel 102 can be employed as needed or desired. The primary barrel 102 can be mounted on a land-borne platform (in some instances with the primary barrel 102 positioned at least partly within a bore hole in a solid earth formation), on a water-borne platform (in some instances with the primary barrel 102 positioned at least partly submerged in a body of water), or on an airborne platform.

For launching the small payloads described above, a suitable length for the primary barrel 102 can be longer than about 25 feet long and shorter than about 50. feet long. A suitable internal bore diameter for the primary barrel 102 can be greater than about 2.0 inches and less than about 5.0 inches. The primary barrel 102, the primary propellant (whatever its type), and the primary projectile 102 can be arranged so that the primary projectile 100 attains a muzzle velocity greater than about $7.0 \times 10^3$ feet per second upon launch from the primary barrel 102, or in some instances greater than about $1.0 \times 10^4$ feet per second.

The primary projectile 100 serves as an airborne gun that includes the secondary barrel 202. The secondary barrel 202 and the secondary projectile 200 are arranged so that ignition, detonation, or expansion of a secondary propellant 204 within the secondary barrel 202 launches the secondary projectile 200 (including the payload) from the secondary barrel 202, thereby providing the second stage of propulsion of the payload. The secondary barrel 202 can be arranged as a gun in any suitable way and can be made from any one or more suitable materials, for example various steels or other metals commonly employed for making gun or cannon barrels. However, because the secondary barrel is part of the primary projectile 100, weight reduction is desirable. In some embodiments the secondary barrel 202 can comprise a metal liner and an outer wrapping comprising carbon fiber or other composite material or nitrocellulose or other polymer material. Prior to firing the apparatus to launch the payload, the secondary projectile 200 (including the payload) is contained within the secondary barrel 202. The secondary barrel 202 and the secondary projectile 200 can be arranged as a gun or cannon in any suitable way so that ignition, detonation, or expansion of a secondary propellant 204 within the secondary barrel 202 launches the secondary projectile 200 from the secondary barrel 202, thereby providing the second stage of propulsion for the payload.

The secondary propellant 204 typically comprises a combustible or explosive compound or mixture, and the secondary barrel 202 is arranged so that expansion of a gas or gaseous mixture released by ignition or detonation of the secondary propellant 204 propels the secondary projectile 200 out of the secondary barrel 202. In some embodiments the secondary barrel is a smooth-bore barrel; in other embodiments the secondary barrel 202 is a rifled barrel arranged so as to impart spin onto the secondary projectile 200 upon its launch from the secondary barrel 202. Because the secondary projectile typically is launched where the atmosphere is negligibly thin, fin stabilization is ineffective, however, the overall need for stabilization is also reduced. Rifling in the secondary barrel 202 can have a lower twist rate than would typically be employed in a standard rifle barrel.

For launching the small payloads described above, a suitable length for the secondary barrel 202 can be longer than about 12 inches long and shorter than about 60. inches long. A suitable bore diameter can be greater than about 0.2 inches and less than about 0.5 inches. The secondary barrel 202, the secondary propellant 204, and the secondary projectile 200 can be arranged so that the secondary projectile 200 attains a muzzle velocity greater than about $4.0 \times 10^3$ feet per second, or greater than about $6.0 \times 10^3$ feet per second, upon launch from the secondary barrel 202.

The primary projectile 100 can include one or more aerodynamic structural elements arranged so as to result in a desired atmospheric flight attitude, or reduce aerodynamic drag, during flight of the primary projectile through a portion of earth's atmosphere after being launched from the primary barrel 102. Examples of such aerodynamic structural elements can include one or more fins 206 on a rearward portion of the secondary barrel 202, or a nosecone 208 on a forward end of the secondary barrel 202. If a nosecone 208 is employed, it can be arranged to move so as to open a forward end of the secondary barrel (with or without detaching from the secondary barrel 202) after the primary projectile 100 is launched from the primary barrel 102 and before the secondary projectile 200 is launched from the secondary barrel 202.

It is desirable for the primary projectile 100 to pass through the bulk of the earth's atmosphere, or at least to reach an altitude where the atmospheric density is significantly reduced, before the secondary projectile 200 is launched, to reduce atmospheric drag on the secondary projectile 200 or the payload. In some embodiments the primary projectile 100 or the secondary projectile 200 is arranged so as to trigger launch of the secondary projectile 200 from the secondary barrel 202 only when the primary projectile 100 is within a selected altitude window after launch from the primary barrel 102. In some examples, the selected altitude window lies within a range between about $2.0 \times 10^5$ feet and about $4.0 \times 10^5$ feet above sea level; other suitable ranges can be employed. In such embodiments, the primary or secondary projectile can include an altimeter or timer arranged so as to trigger launch of the secondary projectile 200 from the secondary barrel 202 only when the primary projectile 100 is within the selected altitude window. It may be desirable to keep the selected altitude window below an altitude that would result in restriction or regulation of launch of the secondary projectile 200 (e.g., below the so-called Karman line at an altitude of 100,000 meters above sea level). After launching the secondary projectile 200, the primary projectile 100 typically falls back to earth. In some examples, the primary projectile 100 can be recovered and reused.

In some examples, the primary projectile 100 or the secondary projectile 200 can be arranged so as to trigger launch of the secondary projectile 200 from the secondary barrel 202 only when the primary projectile 100 falls below a selected speed threshold after launch from the primary barrel 102 (i.e., when the primary projectile has approached to within a desired range of its apogee and before it has begun to fall back to earth). In some examples, the selected speed threshold is about 250 feet per second; other suitable speed thresholds can be employed. In such embodiments, the primary projectile 100 or the secondary projectile 200 can include a velocity meter or timer arranged so as to trigger launch of the secondary projectile 200 from the secondary barrel 202 only when the primary projectile 100 is below the selected speed threshold.

In some examples the secondary barrel 202 is substantially vertical during launch of the secondary projectile 200. Such an arrangement can be suitable if only suborbital flight is needed or desired. Vertical launch of the secondary projectile 200 can be suitable if escaping earth's gravitational field, by reaching or exceeding earth escape velocity, is needed or desired, and if sufficient velocity can be imparted onto the payload. If insertion into a stable earth orbit is needed or desired, the primary projectile can include a guidance system arranged so as to alter attitude of the primary projectile from an atmospheric flight attitude (typically substantially vertical) to a secondary launch attitude (non-vertical, e.g., substantially horizontal). Such an alteration of attitude occurs during or after a latter portion of atmospheric flight of the primary projectile 100 and before launching the secondary projectile 200 from the secondary barrel 202. Any suitable secondary launch attitude can be employed that, in conjunction with velocity imparted into the payload, results in a stable earth orbit for the payload. Any suitable guidance mechanism can be employed to effect the alteration of attitude, e.g., thrusters, gyroscopes, aerodynamic control surfaces, and so forth.

In any of the examples described herein, the primary projectile 100, the secondary projectile 200, or the payload (included, incorporated, or contained in the secondary projectile 200) includes (i) human or animal cremation remains, (ii) human or animal DNA, (iii) encoded, embedded, inscribed, contained, or otherwise included text, images, or other information. In some examples, only two stages of propulsion are employed, i.e., launch of the primary projectile 100 from the barrel followed by launch of the secondary projectile 200 from the secondary barrel 202, with the payload included, incorporated, or contained in the secondary projectile 200.

In some other examples, however, a third stage of propulsion is employed for propelling the payload. In some of those examples, the secondary projectile 200 can include a volume of a secondary explosive material 210 arranged so that detonation of the secondary explosive material 210 (e.g., using detonator 212) propels at least a portion of the payload away from a remainder of the secondary projectile 200 in a payload launch direction. Typically, the payload launch direction is substantially parallel to the secondary barrel; there can be examples wherein that is not the case. In some examples the payload comprises a material (e.g., cremation remains) dispersed within the volume of the secondary explosive material 210.

Figure 3A:
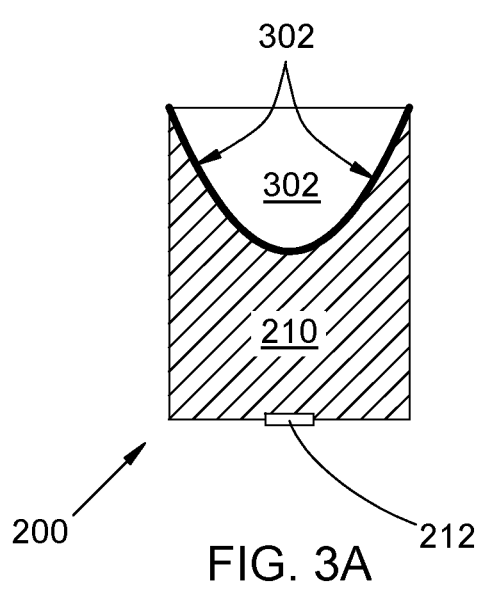
FIGS. 3A and 3B illustrate schematically longitudinal cross sections of an example of a secondary projectile arranged as a shaped charge, before and after detonation, respectively.
Figure 3B:
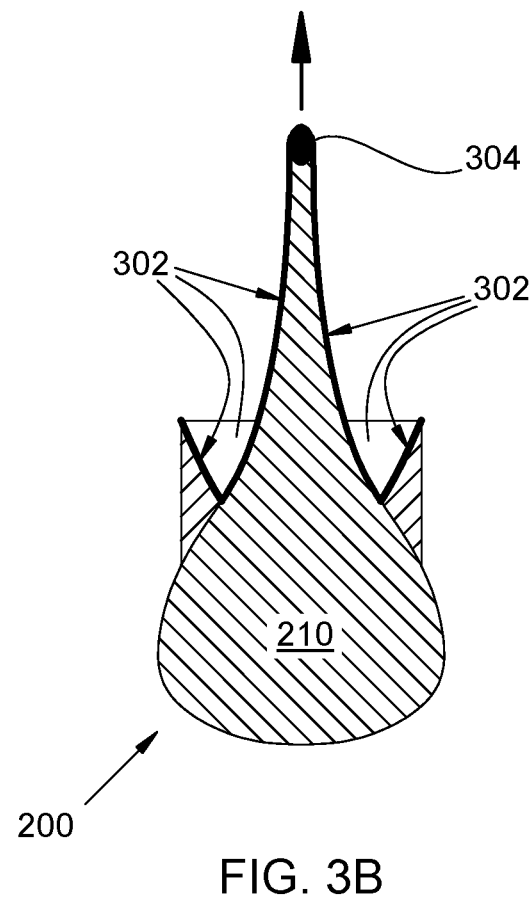
Figure 4A:
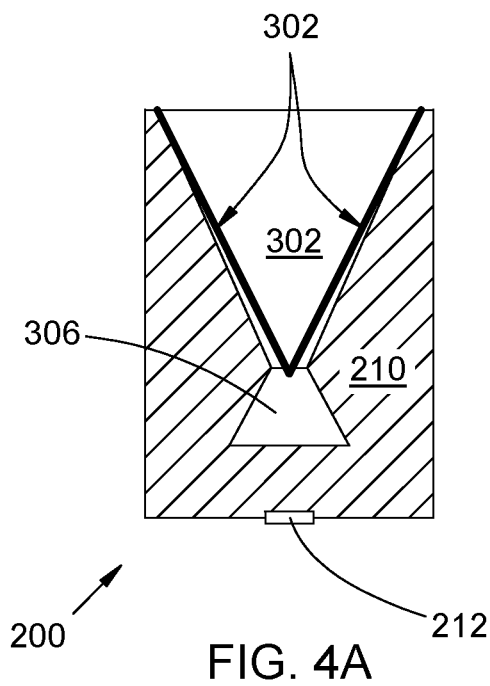
FIGS. 4A and 4B illustrate schematically longitudinal cross sections of examples of secondary projectile arranged as shaped charges, with and without a cavity behind the liner, respectively.
Figure 4B:
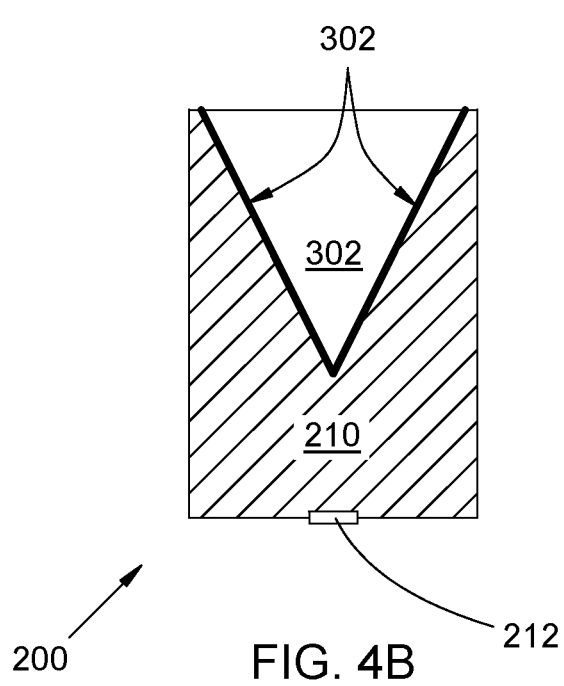

In some examples the volume of the secondary explosive material 210 includes a concavity on a surface thereof, typically its forward surface (FIG. 3A). The concavity serves to direct preferentially, in the payload launch direction, blast force resulting from detonation of the secondary explosive material 210. In other words, the secondary explosive material 210 with such an concavity acts as a so-called shaped charge. The concavity can assume any suitable shape, e.g., a cone or conical frustum, a hemisphere or other spherical segment, or other suitable concave shape. In some examples the secondary projectile 200 further includes a liner 302 (typically metal such as copper, iron, tantalum, or other ductile metal; any suitable material can be employed) in the concavity. The liner 302 and the concavity are arranged so that, upon detonation of the secondary explosive material 210, the liner forms a slug 304 of liner material launched along the payload launch direction (FIG. 3B). In such examples, the slug 304 includes or incorporates at least a portion of the payload. Any suitable arrangement of the secondary explosive material 210, the concavity, the liner 302, and other portions of the secondary projectile 200 can be employed that provide suitable behavior as a shaped charge. In some embodiments, except for the slug 304, the secondary projectile 200 is converted to myriad minute particles or one or more gaseous substances upon detonation of the secondary explosive material 210, thereby reducing or eliminating collision hazards for other orbital objects, such as satellites. In some examples the slug can be accelerated to more than about $7.0 \times 10^3$ feet per second (relative to the secondary projectile's velocity), resulting in an overall velocity of the slug 304 of more than about $1.4 \times 10^4$ feet per second. In other examples, a hollow or reduced density cavity 306 is formed within the secondary explosive material 210 behind the liner 302 (FIG. 4A; contrasted with FIG. 4B which shows a concavity with no cavity 306 behind the liner 302); in those examples, the slug 304 can be accelerated to more than about $2.5 \times 10^4$ feet per second or more than about $3.3 \times 10^4$ feet per second (relative to the secondary projectile's velocity), resulting in an overall velocity for the slug 304 of more than about $3.2 \times 10^4$ feet per second or more than about $4.0 \times 10^4$ feet per second (i.e., near or above earth escape velocity).

The secondary projectile 200 can include an aerodynamic nosecone enclosing a volume in front of the concavity, however, such a nosecone typically would not be needed in the negligibly thin atmospheric conditions under which the secondary explosive material 210 is detonated. In some examples, the secondary explosive material 210 is detonated nearly simultaneously with the secondary projectile leaving the secondary barrel 202. One advantage of such an arrangement is that detonation hardware or circuitry can be incorporated into the primary projectile 100. Another advantage of such an arrangement is reduced likelihood that the secondary projectile 200 would have a chance to wobble or tumble so as to misalign the payload launch direction from the direction of the secondary parallel 202 before detonation of the secondary explosive material 210. In most examples, the payload launch direction and the secondary barrel (i.e., a secondary projectile launch direction) are substantially parallel. In other examples, the secondary explosive material 210 can be detonated at any suitable time interval after igniting or detonating the secondary propellant 204.

In some examples, the payload includes material deposited on or dispersed within the liner material, such as human or animal cremation remains or human or animal DNA. In some examples, the payload comprises the liner 302, which includes microscopic text, images, or other information (i) embedded or encoded within the liner material or (ii) inscribed or encoded on the liner surface.

In examples that include the secondary explosive material 210, the primary projectile 100 can include a guidance system (e.g., thrusters, gyroscopes, or aerodynamic control surfaces) arranged so as to alter attitude of the primary projectile 100 from its atmospheric flight attitude (typically substantially vertical) to a secondary launch attitude (non-vertical, e.g., substantially horizontal). The alteration of attitude is effected during or after a latter portion of atmospheric flight of the primary projectile 100, before launching the secondary projectile 200 from the secondary barrel 202, and before detonation of the secondary explosive material 210. Launching the secondary projectile 200 from the secondary barrel 202 and detonating the secondary explosive material 210 (after launching the primary projectile 100 from the primary barrel 102, with the secondary barrel 202 oriented at the secondary launch attitude, and typically with the payload launch direction parallel to the secondary barrel) can be arranged so that the payload (or at least a portion thereof) achieves a stable earth orbit. If sufficient velocity of the payload is achieved, the payload can reach or exceed earth escape velocity.

In other examples, the secondary barrel, and the typically substantially parallel payload launch direction, are substantially vertical during launch of the secondary projectile and detonation of the secondary explosive material 210. If sufficient velocity of the payload is achieved, the payload can reach or exceed earth escape velocity. Otherwise, only suborbital flight of the payload is achieved.

A method for launching the payload comprises: (A) loading the secondary projectile 200 incorporating or containing the payload into the secondary barrel 200 of the primary projectile 100; (B) loading the primary projectile 100 into the primary barrel 102; (C) igniting, detonating, or expanding the primary propellant 104 within the primary barrel 102 to launch the primary projectile 100 from the primary barrel 102; and (D) after launching the primary projectile 100, igniting or detonating the secondary propellant 204 within the secondary barrel 202 to launch the secondary projectile 200 from the secondary barrel 202. The method can further comprise, after igniting or detonating the secondary propellant 204, detonating the secondary explosive material 210 incorporated into the secondary projectile 200 to propel at least a portion of the payload away from the remainder of the secondary projectile 200 in the payload launch direction.

A method for preparing the payload for launch comprises incorporating or containing the payload in the secondary projectile 200. The secondary projectile 200 is arranged to be loaded into the secondary barrel 202 of the primary projectile 100 so that ignition, detonation, or expansion of the secondary propellant 204 within the secondary barrel 202 launches the secondary projectile 200 from the secondary barrel 202. The primary projectile 100 is arranged to be loaded into the primary barrel 102 so that ignition, detonation, or expansion of the primary propellant 104 within the primary barrel 102 launches the primary projectile 100 from the primary barrel 102. The method can further comprise incorporating the secondary explosive material 210 into the secondary projectile 200. The secondary explosive material 210 is arranged so that detonation of the secondary explosive material 210 propels at least a portion of the payload 200 away from the remainder of the secondary projectile 200 in a payload launch direction.

In addition to the preceding, the following examples fall within the scope of the present disclosure or appended claims:

Example 1

An apparatus for launching a payload, the apparatus comprising a primary barrel, a primary projectile including a secondary barrel, and a secondary projectile including the payload, wherein: (a) prior to firing the apparatus to launch the payload, the primary projectile is contained within the primary barrel, and the secondary projectile is contained within the secondary barrel; (b) the primary barrel and the primary projectile are arranged so that ignition, detonation, or expansion of a primary propellant within the primary barrel launches the primary projectile from the primary barrel; and (c) the secondary barrel and the secondary projectile are arranged so that ignition, detonation, or expansion of a secondary propellant within the secondary barrel launches the secondary projectile from the secondary barrel.

Example 2

The apparatus of Example 1 wherein the apparatus is arranged so that the primary barrel is substantially vertical during launch of the primary projectile.

Example 3

The apparatus of any one of Examples 1 or 2 wherein the primary barrel is mounted on a land-borne platform, on a water-borne platform, or on an airborne platform.

Example 4

The apparatus of any one of Examples 1 through 3 wherein the primary barrel is positioned at least partly within a bore hole in a solid earth formation, or at least partially submerged in a body of water.

Example 5

The apparatus of any one of Examples 1 through 4 wherein the primary barrel is longer than about 25 feet long and shorter than about 50. feet long.

Example 6

The apparatus of any one of Examples 1 through 5 wherein the primary barrel has an internal bore diameter that is greater than about 2.0 inches and less than about 5.0 inches.

Example 7

The apparatus of any one of Examples 1 through 6 wherein the primary barrel, the primary propellant, and the primary projectile are arranged so that, upon launching the primary projectile, the primary projectile attains a muzzle velocity greater than about $7.0 \times 10^3$ feet per second.

Example 8

The apparatus of any one of Examples 1 through 7 wherein the primary propellant comprises a combustible or explosive compound or mixture, and the primary barrel is arranged so that expansion of a gas or gaseous mixture released by ignition or detonation of the primary propellant propels the primary projectile out of the primary barrel.

Example 9

The apparatus of any one of Examples 1 through 8 wherein the primary propellant comprises a gas or gaseous mixture, and the primary barrel is arranged so that expansion of a gas or gaseous mixture injected or released into the primary barrel propels the primary projectile out of the primary barrel.

Example 10

The apparatus of any one of Examples 1 through 9 wherein the primary barrel is arranged so that an expanding gas or gaseous mixture that propels the primary projectile out of the barrel enters the primary barrel at multiple locations along the length of the primary barrel.

Example 11

The apparatus of any one of Examples 1 through 10 wherein the primary projectile includes one or more aerodynamic structural elements arranged so as to result in a desired atmospheric flight attitude, or reduce aerodynamic drag, during flight of the primary projectile through a portion of earth's atmosphere after being launched from the primary barrel.

Example 12

The apparatus of Example 11 wherein the one or more aerodynamic structural elements include one or more fins on a rearward portion of the secondary barrel, or a nosecone on a forward end of the secondary barrel.

Example 13

The apparatus of any one of Examples 11 or 12 wherein the one or more aerodynamic structural elements include a nosecone on a forward end of the secondary barrel, and the nosecone is arranged to move so as to open a forward end of the secondary barrel after the primary projectile is launched from the primary barrel and before the secondary projectile is launched from the secondary barrel.

Example 14

The apparatus of any one of Examples 1 through 13 wherein the primary projectile or the secondary projectile is arranged so as to trigger launch of the secondary projectile from the secondary barrel only when the primary projectile is within a selected altitude window after launch from the primary barrel.

Example 15

The apparatus of Example 14 wherein the selected altitude window lies within a range between about $2.0 \times 10^5$ feet and about $4.0 \times 10^5$ feet above sea level, or below about $1.0 \times 10^5$ meters above sea level.

Example 16

The apparatus of any one of Examples 14 or 15 wherein the primary or secondary projectile includes an altimeter arranged so as to trigger launch of the secondary projectile from the secondary barrel only when the primary projectile is within the selected altitude window.

Example 17

The apparatus of any one of Examples 14 through 16 wherein the primary or secondary projectile includes a timer arranged so as to trigger launch of the secondary projectile from the secondary barrel only when the primary projectile is within the selected altitude window.

Example 18

The apparatus of any one of Examples 1 through 17 wherein the primary projectile or the secondary projectile is arranged so as to trigger launch of the secondary projectile from the secondary barrel only when the primary projectile falls below a selected speed threshold after launch from the primary barrel.

Example 19

The apparatus of Example 18 wherein the selected speed threshold is about 250 feet per second.

Example 20

The apparatus of any one of Examples 18 or 19 wherein the primary projectile includes a velocity meter arranged so as to trigger launch of the secondary projectile from the secondary barrel only when the primary projectile is below the selected speed threshold.

Example 21

The apparatus of any one of Examples 18 through 20 wherein the primary projectile includes a timer arranged so as to trigger launch of the secondary projectile from the secondary barrel only when the primary projectile is below the selected speed threshold.

Example 22

The apparatus of any one of Examples 1 through 21 wherein the primary projectile includes a guidance system arranged so as to alter attitude of the primary projectile from an atmospheric flight attitude to a secondary launch attitude, during or after a latter portion of atmospheric flight of the primary projectile and before launching the secondary projectile from the secondary barrel.

Example 23

The apparatus of Example 22 wherein the apparatus is arranged so that launching the secondary projectile from the secondary barrel, after launching the primary projectile from the primary barrel and with the secondary barrel oriented at the secondary launch attitude, results in the payload achieving a stable earth orbit.

Example 24

The apparatus of any one of Examples 1 through 21 wherein the apparatus is arranged so that the secondary barrel is substantially vertical during launch of the secondary projectile.

Example 25

The apparatus of Example 24 wherein the apparatus is arranged so that launching the secondary projectile from the secondary barrel, after launching the primary projectile from the primary barrel and with the secondary barrel substantially vertical, results in the payload achieving earth escape velocity.

Example 26

The apparatus of any one of Examples 1 through 25 wherein the secondary barrel is longer than about 12 inches long and shorter than about 60. inches long.

Example 27

The apparatus of any one of Examples 1 through 26 wherein the secondary barrel has an internal bore diameter that is greater than about 0.2 inches and less than about 0.5 inches.

Example 28

The apparatus of any one of Examples 1 through 27 wherein the secondary barrel, the secondary propellant, and the secondary projectile are arranged so that, upon launching the secondary projectile, the secondary projectile attains a muzzle velocity greater than about $4.0 \times 10^3$ feet per second.

Example 29

The apparatus of any one of Examples 1 through 28 wherein the secondary propellant comprises a combustible or explosive compound or mixture, and the secondary barrel is arranged so that expansion of a gas or gaseous mixture released by ignition or detonation of the secondary propellant propels the secondary projectile out of the secondary barrel.

Example 30

The apparatus of any one of Examples 1 through 29 wherein the secondary barrel is a smooth-bore barrel.

Example 31

The apparatus of any one of Examples 1 through 29 wherein the secondary barrel is a rifled barrel arranged so as to impart spin onto the secondary projectile upon launch of the secondary projectile from the secondary barrel.

Example 32

The apparatus of any one of Examples 1 through 31 wherein the primary projectile, the secondary projectile, or the payload includes human or animal cremation remains.

Example 33

The apparatus of any one of Examples 1 through 32 wherein the primary projectile, the secondary projectile, or the payload includes human or animal DNA.

Example 34

The apparatus of any one of Examples 1 through 33 wherein the primary projectile, the secondary projectile, or the payload includes text, images, or other information (i) encoded, embedded, or contained within the secondary projectile, or (ii) encoded or inscribed on the secondary projectile.

Example 35

The apparatus of any one of Examples 1 through 34 wherein the secondary projectile includes a volume of a secondary explosive material arranged so that detonation of the secondary explosive material propels at least a portion of the payload away from a remainder of the secondary projectile in a payload launch direction.

Example 36

The apparatus of Example 35 wherein the payload launch direction is substantially parallel to the secondary barrel.

Example 37

The apparatus of any one of Examples 35 or 36 wherein the payload comprises a material dispersed within the volume of the secondary explosive material.

Example 38

The apparatus of Example 37 wherein the dispersed material comprises human or animal cremation remains.

Example 39

The apparatus of any one of Examples 35 through 38 wherein the volume of the secondary explosive material includes an concavity on a surface thereof that is arranged so as to direct preferentially, in the payload launch direction, blast force resulting from detonation of the secondary explosive material.

Example 40

The apparatus of Example 39 wherein the secondary projectile includes a liner in the concavity, and the liner and the concavity are arranged so that, upon detonation of the secondary explosive material, the liner forms a slug of liner material launched along the payload launch direction.

Example 41

The apparatus of Example 40 wherein the payload includes material deposited on or dispersed within the liner material.

Example 42

The apparatus of Example 41 wherein the deposited or dispersed payload material includes human or animal cremation remains or human or animal DNA.

Example 43

The apparatus of any one of Examples 40 through 42 wherein the payload comprises the liner, and the liner includes microscopic text, images, or other information (i) embedded or encoded within the liner material or (ii) inscribed or encoded on the liner surface.

Example 44

The apparatus of any one of Examples 40 through 43 wherein the secondary projectile includes a hollow or reduced density cavity, within the secondary explosive material behind the liner, arranged so that upon detonation of the secondary explosive material the slug attains speed greater than about $2.5 \times 10^4$ feet per second relative to the secondary projectile.

Example 45

The apparatus of any one of Examples 36 through 44 wherein the primary projectile includes a guidance system arranged so as to alter attitude of the primary projectile from an atmospheric flight attitude to a secondary launch attitude, during or after a latter portion of atmospheric flight of the primary projectile, before launching the secondary projectile from the secondary barrel, and before detonation of the secondary explosive material.

Example 46

The apparatus of Example 45 wherein the apparatus is arranged so that launching the secondary projectile from the secondary barrel and detonating the secondary explosive material, after launching the primary projectile from the primary barrel and with the secondary barrel oriented at the secondary launch attitude, result in the payload achieving a stable earth orbit.

Example 47

The apparatus of any one of Examples 36 through 44 wherein the apparatus is arranged so that the secondary barrel is substantially vertical during launch of the secondary projectile.

Example 48

The apparatus of Example 47 wherein the apparatus is arranged so that launching the secondary projectile from the secondary barrel and detonating the secondary explosive material, after launching the primary projectile from the primary barrel and with the secondary barrel substantially vertical, result in the payload achieving earth escape velocity.

Example 49

A method for launching a payload using the apparatus of any one of Examples 1 through 48, the method comprising: (A) loading the secondary projectile incorporating or containing the payload into a secondary barrel of a primary projectile; (B) loading the primary projectile into a primary barrel; (C) igniting, detonating, or expanding a primary propellant within the primary barrel to launch the primary projectile from the primary barrel; and (D) after launching the primary projectile, igniting or detonating a secondary propellant within the secondary barrel to launch the secondary projectile from the secondary barrel.

Example 50

The method of Example 49 further comprising, after igniting or detonating the secondary propellant, detonating a volume of secondary explosive material incorporated into the secondary projectile to propel at least a portion of the payload away from a remainder of the secondary projectile in a payload launch direction.

Example 51

A method for preparing a payload for launch using the apparatus of any one of Examples 1 through 48, the method comprising including, incorporating, or containing the payload in a secondary projectile, wherein: (A) the secondary projectile is arranged to be loaded into a secondary barrel of a primary projectile so that ignition, detonation, or expansion of a secondary propellant within the secondary barrel launches the secondary projectile from the secondary barrel; and (B) the primary projectile is arranged to be loaded into a primary barrel so that ignition, detonation, or expansion of a primary propellant within the primary barrel launches the primary projectile from the primary barrel.

Example 52

The method of Example 51 further comprising incorporating a volume of secondary explosive material into the secondary projectile, wherein the volume of secondary explosive material is arranged so that detonation of the secondary explosive material propels at least a portion of the payload away from a remainder of the secondary projectile in a payload launch direction.

It is intended that equivalents of the disclosed example embodiments and methods shall fall within the scope of the present disclosure or appended claims. It is intended that the disclosed example embodiments and methods, and equivalents thereof, may be modified while remaining within the scope of the present disclosure or appended claims. For purposes of the present disclosure, the terms "example" and "embodiment" should be considered equivalent and interchangeable.

In the foregoing Detailed Description, various features may be grouped together in several example embodiments for the purpose of streamlining the disclosure. This method of disclosure is not to be interpreted as reflecting an intention that any claimed embodiment requires more features than are expressly recited in the corresponding claim. Rather, as the appended claims reflect, inventive subject matter may lie in less than all features of a single disclosed example embodiment. Thus, the appended claims are hereby incorporated into the Detailed Description, with each claim standing on its own as a separate disclosed embodiment. However, the present disclosure shall also be construed as implicitly disclosing any embodiment having any suitable set of one or more disclosed or claimed features (i.e., a set of features that are neither incompatible nor mutually exclusive) that appear in the present disclosure or the appended claims, including those sets that may not be explicitly disclosed herein. In addition, for purposes of disclosure, each of the appended dependent claims shall be construed as if written in multiple dependent form and dependent upon all preceding claims with which it is not inconsistent. It should be further noted that the scope of the appended claims does not necessarily encompass the whole of the subject matter disclosed herein.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives. For purposes of the present disclosure and appended claims, the words "comprising," "including," "having," and variants thereof, wherever they appear, shall be construed as open ended terminology, with the same meaning as if the phrase "at least" were appended after each instance thereof, unless explicitly stated otherwise. For purposes of the present disclosure or appended claims, when terms are employed such as "about equal to," "substantially equal to," "greater than about," "less than about," and so forth, in relation to a numerical quantity, standard conventions pertaining to measurement precision and significant digits shall apply, unless a differing interpretation is explicitly set forth. For null quantities described by phrases such as "substantially prevented," "substantially absent," "substantially eliminated," "about equal to zero," "negligible," and so forth, each such phrase shall denote the case wherein the quantity in question has been reduced or diminished to such an extent that, for practical purposes in the context of the intended operation or use of the disclosed or claimed apparatus or method, the overall behavior or performance of the apparatus or method does not differ from that which would have occurred had the null quantity in fact been completely removed, exactly equal to zero, or otherwise exactly nulled.

In the appended claims, any labelling of elements, steps, limitations, or other portions of a claim (e.g., first, second, etc., (a), (b), (c), etc., or (i), (ii), (iii), etc.) is only for purposes of clarity, and shall not be construed as implying any sort of ordering or precedence of the claim portions so labelled. If any such ordering or precedence is intended, it will be explicitly recited in the claim or, in some instances, it will be implicit or inherent based on the specific content of the claim. In the appended claims, if the provisions of 35 USC § 112(f) are desired to be invoked in an apparatus claim, then the word "means" will appear in that apparatus claim. If those provisions are desired to be invoked in a method claim, the words "a step for" will appear in that method claim. Conversely, if the words "means" or "a step for" do not appear in a claim, then the provisions of 35 USC § 112(f) are not intended to be invoked for that claim.

If any one or more disclosures are incorporated herein by reference and such incorporated disclosures conflict in part or whole with, or differ in scope from, the present disclosure, then to the extent of conflict, broader disclosure, or broader definition of terms, the present disclosure controls. If such incorporated disclosures conflict in part or whole with one another, then to the extent of conflict, the later-dated disclosure controls.

The Abstract is provided as required as an aid to those searching for specific subject matter within the patent literature. However, the Abstract is not intended to imply that any elements, features, or limitations recited therein are necessarily encompassed by any particular claim. The scope of subject matter encompassed by each claim shall be determined by the recitation of only that claim.

What is claimed is:

1. An apparatus for launching a payload, the apparatus comprising a primary barrel, a primary projectile including a secondary barrel, and a secondary projectile including the payload, wherein:
    (a) prior to firing the apparatus to launch the payload, the primary projectile is contained within the primary barrel, and the secondary projectile is contained within the secondary barrel;
    (b) the primary barrel and the primary projectile are arranged so that ignition, detonation, or expansion of a primary propellant within the primary barrel launches ballistically the primary projectile from the primary barrel; and
    (c) the secondary barrel and the secondary projectile are arranged so that ignition, detonation, or expansion of a secondary propellant within the secondary barrel launches ballistically the secondary projectile from the secondary barrel,
    and wherein:
    (d) the primary projectile includes one or more aerodynamic structural elements arranged so as to result in a desired atmospheric flight attitude, or reduce aerodynamic drag, during ballistic flight of the primary projectile through a portion of earth's atmosphere after being launched from the primary barrel, the one or more aerodynamic structural elements include a nosecone on a forward end of the secondary barrel, and the nosecone is arranged to move so as to open a forward end of the secondary barrel after the primary projectile is launched from the primary barrel and before the secondary projectile is launched from the secondary barrel;
    (e) the primary or secondary projectile includes an altimeter, a velocity meter, or a timer arranged so as to trigger launch of the secondary projectile from the secondary barrel only when the primary projectile is within a selected altitude window or falls below a selected speed threshold; or
    (f) the primary projectile includes a guidance system arranged so as to alter attitude of the primary projectile from a ballistic atmospheric flight attitude to a secondary launch attitude, during or after a latter portion of ballistic atmospheric flight of the primary projectile and before launching the secondary projectile from the secondary barrel.

2. The apparatus of claim 1 wherein the apparatus is arranged so that the primary barrel is substantially vertical during launch of the primary projectile.

3. The apparatus of claim 1 wherein the primary barrel is longer than about 25 feet long and shorter than about 50 feet long and has an internal bore diameter that is greater than about 2.0 inches and less than about 5.0 inches.

4. The apparatus of claim 1 wherein the primary barrel, the primary propellant, and the primary projectile are arranged so that, upon launching the primary projectile, the primary projectile attains a muzzle velocity greater than about $7.0 \times 10^3$ feet per second.

5. The apparatus of claim 1 wherein the primary projectile includes one or more aerodynamic structural elements arranged so as to result in a desired atmospheric flight attitude, or reduce aerodynamic drag, during ballistic flight of the primary projectile through a portion of earth's atmosphere after being launched from the primary barrel.

6. The apparatus of claim 5 wherein the one or more aerodynamic structural elements include a nosecone on a forward end of the secondary barrel, and the nosecone is arranged to move so as to open a forward end of the secondary barrel after the primary projectile is launched from the primary barrel and before the secondary projectile is launched from the secondary barrel.

7. The apparatus of claim 1 wherein the primary projectile or the secondary projectile is arranged so as to trigger launch of the secondary projectile from the secondary barrel only when the primary projectile is between about $2.0 \times 10^5$ feet and about $4.0 \times 10^5$ feet above sea level or falls below about 250 feet per second.

8. The apparatus of claim 1 wherein the primary or secondary projectile includes an altimeter, a velocity meter, or a timer arranged so as to trigger launch of the secondary projectile from the secondary barrel only when the primary projectile is within a selected altitude window or falls below a selected speed threshold.

9. The apparatus of claim 1 wherein the primary projectile includes a guidance system arranged so as to alter attitude of the primary projectile from a ballistic atmospheric flight attitude to a secondary launch attitude, during or after a latter portion of ballistic atmospheric flight of the primary projectile and before launching the secondary projectile from the secondary barrel.

10. The apparatus of claim 1 wherein the secondary barrel is longer than about 12 inches long and shorter than about 60 inches long and has an internal bore diameter that is greater than about 0.2 inches and less than about 0.5 inches.

11. The apparatus of claim 1 wherein the primary projectile, the secondary projectile, or the payload includes (i) human or animal cremation remains or (ii) human or animal DNA.

12. The apparatus of claim 1 wherein the secondary projectile includes a volume of a secondary explosive material arranged so that detonation of the secondary explosive material propels ballistically at least a portion of the payload away from a remainder of the secondary projectile in a payload launch direction.

13. The apparatus of claim 12 wherein the payload comprises a material dispersed within the volume of the secondary explosive material.

14. The apparatus of claim 13 wherein the dispersed payload material includes human or animal cremation remains or human or animal DNA.

15. An apparatus for launching a payload, the apparatus comprising a primary barrel, a primary projectile including a secondary barrel, and a secondary projectile including the payload, wherein:
   (a) prior to firing the apparatus to launch the payload, the primary projectile is contained within the primary barrel, and the secondary projectile is contained within the secondary barrel;
   (b) the primary barrel and the primary projectile are arranged so that ignition, detonation, or expansion of a primary propellant within the primary barrel launches ballistically the primary projectile from the primary barrel;
   (c) the secondary barrel and the secondary projectile are arranged so that ignition, detonation, or expansion of a secondary propellant within the secondary barrel launches ballistically the secondary projectile from the secondary barrel; and
   (d) the secondary barrel, the secondary propellant, and the secondary projectile are arranged so that, upon launching the secondary projectile, the secondary projectile attains a muzzle velocity greater than about $4.0 \times 10^3$ feet per second.

16. An apparatus for launching a payload, the apparatus comprising a primary barrel, a primary projectile including a secondary barrel, and a secondary projectile including the payload, wherein:
   (a) prior to firing the apparatus to launch the payload, the primary projectile is contained within the primary barrel, and the secondary projectile is contained within the secondary barrel;
   (b) the primary barrel and the primary projectile are arranged so that ignition, detonation, or expansion of a primary propellant within the primary barrel launches ballistically the primary projectile from the primary barrel;
   (c) the secondary barrel and the secondary projectile are arranged so that ignition, detonation, or expansion of a secondary propellant within the secondary barrel launches ballistically the secondary projectile from the secondary barrel;
   (d) the secondary projectile includes a volume of a secondary explosive material arranged so that detonation of the secondary explosive material propels ballistically at least a portion of the payload away from a remainder of the secondary projectile in a payload launch direction; and
   (e) the volume of the secondary explosive material includes a concavity on a surface thereof that is arranged so as to direct preferentially, in the payload launch direction, blast force resulting from detonation of the secondary explosive material.

17. The apparatus of claim 16 wherein the primary projectile includes a guidance system arranged so as to alter attitude of the primary projectile from a ballistic atmospheric flight attitude to a secondary launch attitude, during or after a latter portion of ballistic atmospheric flight of the primary projectile, before launching the secondary projectile from the secondary barrel, and before detonation of the secondary explosive material.

18. The apparatus of claim 16 wherein the apparatus is arranged so that the secondary barrel is substantially vertical during launch of the secondary projectile.

19. The apparatus of claim 16 wherein the secondary projectile includes a liner in the concavity, and the liner and the concavity are arranged so that, upon detonation of the secondary explosive material, the liner forms a slug of liner material launched ballistically along the payload launch direction.

20. The apparatus of claim 19 wherein the payload comprises the liner, and the liner includes microscopic text, images, or other information (i) embedded or encoded within the liner material or (ii) inscribed or encoded on the liner surface.

21. The apparatus of claim 19 wherein the secondary projectile includes a hollow or reduced density cavity, within the secondary explosive material behind the liner, arranged so that upon detonation of the secondary explosive material the slug attains speed greater than about $2.5 \times 10^4$ feet per second relative to the secondary projectile.

22. The apparatus of claim 19 wherein the payload includes material deposited on or dispersed within the liner material.

23. The apparatus of claim 22 wherein the deposited or dispersed payload material includes human or animal cremation remains or human or animal DNA.

* * * * *